(12) United States Patent
Park

(10) Patent No.: US 8,382,361 B2
(45) Date of Patent: Feb. 26, 2013

(54) BACKLIGHT ASSEMBLY AND DISPLAY DEVICE HAVING THE SAME

(75) Inventor: Sang-Jun Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 815 days.

(21) Appl. No.: 11/953,322

(22) Filed: Dec. 10, 2007

(65) Prior Publication Data

US 2008/0192505 A1 Aug. 14, 2008

(30) Foreign Application Priority Data

Feb. 14, 2007 (KR) .................. 10-2007-0015147

(51) Int. Cl.
*F21V 7/04* (2006.01)

(52) U.S. Cl. ........ 362/631; 362/615; 362/630; 362/632; 174/254; 174/361

(58) Field of Classification Search .................. 174/254, 174/361; 362/615, 630–632
See application file for complete search history.

(56) References Cited

U.S. PATENT DOCUMENTS

| | | | |
|---|---|---|---|
| 6,847,415 B1 * | 1/2005 | Yoshimura et al. | 349/58 |
| 7,212,413 B2 * | 5/2007 | Chang et al. | 361/749 |
| 7,432,998 B2 * | 10/2008 | Nishio et al. | 349/58 |
| 7,453,532 B2 * | 11/2008 | Kondo et al. | 349/58 |
| 2005/0117367 A1 * | 6/2005 | Chikugawa | 362/561 |
| 2005/0179850 A1 | 8/2005 | Du | |
| 2006/0114689 A1 * | 6/2006 | Chang et al. | 362/561 |
| 2006/0114694 A1 * | 6/2006 | Cho et al. | 362/631 |
| 2006/0203515 A1 * | 9/2006 | Fujikawa et al. | 362/615 |

FOREIGN PATENT DOCUMENTS

| KR | 200383915 | 5/2005 |
|---|---|---|
| KR | 1020060071553 | 6/2006 |

* cited by examiner

*Primary Examiner* — Mary Zettl
(74) *Attorney, Agent, or Firm* — Cantor Colburn LLP

(57) ABSTRACT

A backlight assembly includes a light source, a light-guiding member, a mold frame and a printed circuit board ("PCB"). The light source generates light. The light-guiding member guides the light generated from the light source. The mold frame receives the light-guiding member. An opening is formed through a side of the mold frame. The PCB drives the light source, and includes an extension portion extending through the opening of the mold frame.

20 Claims, 9 Drawing Sheets

BACKLIGHT ASSEMBLY AND DISPLAY DEVICE HAVING THE SAME

This application claims priority to Korean Patent Application No. 2007-15147, filed on Feb. 14, 2007, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a display device having the backlight assembly. More particularly, the present invention relates to a backlight assembly, and a display device having the backlight assembly, which effectively prevents or reduces damage to the display device.

2. Description of the Related Art

Generally, a liquid crystal display ("LCD") device is a type of flat panel display device which displays an image using electrical and optical characteristics of a liquid crystal.

The LCD device includes a liquid crystal control unit which controls a liquid crystal material and a light-providing unit which provides light to the liquid crystal. For example, the LCD device may include an LCD panel assembly which serves as the liquid crystal control unit, and a backlight assembly which serves as the light-providing unit.

The backlight assembly includes a light source and a circuit board to drive the light source. The backlight assembly further includes a mold frame to support the LCD panel and an optical sheet.

The circuit board driving the light source encloses a side portion of the mold frame and extends to a rear surface of the LCD device. Thus, a groove for guiding an extension portion of the circuit board is formed at the mold frame. However, when the extension portion of the circuit board extends to the rear surface of the LCD device through the groove, tension from the extension portion of the circuit board applies stress to a glass substrate of the LCD panel, thereby damaging the glass substrate.

BRIEF SUMMARY OF THE INVENTION

The present invention provides a backlight assembly which effectively prevents or reduces a damage to a display panel and a display device having the display panel.

In one exemplary embodiment of the present invention, a backlight assembly includes a light source, a light-guiding member, a mold frame and a printed circuit board ("PCB"). The light source generates light. The light-guiding member guides the light generated from the light source. The mold frame receives the light-guiding member. An opening is formed through a side of the mold frame. The PCB drives the light source, and includes an extension portion extending through the opening of the mold frame.

The mold frame may include a side portion and a support portion protruding inward from the side portion in a substantially horizontal direction to support the light-guiding member. The opening may be formed at the support portion and a location of the opening corresponds to a location of the light source.

The PCB may further include a light source installed portion on which the light source is disposed, and the extension portion extends from the light source installed portion through the opening of the mold frame. The light source installed portion may include one of a flexible PCB ("FPCB") and a rigid PCB ("RPCB"). The extension portion may be coupled to the light source installed portion through a connector.

A side portion of the mold frame corresponding to the extension portion may include a flat upper surface.

In an exemplary embodiment, a surface which defines the opening and makes contact with the extension portion of the PCB may include a round portion. The mold frame may include a bumper formed on a surface which defines the opening and makes contact with the extension portion of the PCB.

The extension portion may include a flexible portion, and the opening may be open to a side portion of the mold frame corresponding to the extension portion.

In another exemplary embodiment of the present invention, a display device includes a light source, a light-guiding member, a display panel, a mold frame and a first PCB. The light source generates light. The light-guiding member guides the light generated from the light source. The display panel is disposed over the light-guiding member to display an image using the light provided from the light-guiding member. The mold frame receives the light-guiding member. An opening is formed through a side of the mold frame. The first PCB drives the light source, and the first PCB includes an extension portion extending through the opening of the mold frame.

The mold frame includes a side portion and a support portion protruding inward from the side portion in a substantially horizontal direction to support the light-guiding member, the opening being formed at the support portion, and a location of the opening corresponds to a location of the light source.

The first PCB further comprises a light source installed portion on which the light source is disposed, and the extension portion extends from the light source installed portion through the opening of the mold frame.

The light source installed portion includes either a FPCB or an RPCB.

The display device may further include a second PCB electrically connected to an end portion of the display panel to drive the display panel. The second PCB may be bent to be disposed below the mold frame. A circuit element of the second PCB may be positioned within the opening formed through the mold frame. The extension portion of the first PCB may be electrically connected to the second PCB.

In an exemplary embodiment, a throughhole may be formed through the second PCB so that the extension portion of the first PCB passes through the throughhole, and the first PCB may be disposed on a rear surface of the second PCB. The throughhole of the second PCB may correspond to the opening formed through the mold frame. The throughhole may be greater than or equal to a size of the extension portion of the first PCB.

The second PCB may include a connection portion formed on the rear surface of the second PCB corresponding to a terminal formed at an end portion of the extension portion of the first PCB. The connection portion may be electrically connected to the terminal.

In another exemplary embodiment, the first PCB may be disposed on a front surface of the second PCB, and the second PCB may include a connection portion formed on the front surface of the second PCB corresponding to a terminal formed at an end portion of the extension portion of the first PCB. The connection portion may be electrically connected to the terminal.

A side portion of the mold frame corresponding to the extension portion may include a flat upper surface.

A surface which defines the opening and makes contact with the extension portion of the first PCB may include a round portion.

The mold frame may include a bumper formed on a surface which defines the opening and makes contact with the extension portion of the first PCB.

The extension portion may include a flexible portion.

In still another exemplary embodiment of the present invention, a display device includes a light source, a light-guiding member, a display panel, a mold frame, a first PCB and a second PCB. The light source generates light. The light-guiding member guides the light generated from the light source. The display panel is disposed over the light-guiding member to display an image using the light provided from the light-guiding member. The mold frame receives the light-guiding member. An opening is formed through a side of the mold frame. The first PCB drives the light source, and the first PCB includes a first extension portion which is bent and extends through the opening of the mold frame. The second PCB is electrically connected to an end portion of the display panel to drive the display panel.

In an exemplary embodiment, the mold frame may include a side portion and a support portion protruding inward from the side portion in a substantially horizontal direction to support the light-guiding member and the display panel. The opening may be formed at the support portion and a location of the opening corresponds to a location of the light source.

The second PCB may include a second extension portion electrically connected to an end portion of the display panel and bent to be disposed below the mold frame. The second extension portion may include a flexible portion.

In an exemplary embodiment, the mold frame may include a first side portion and a second side portion opposite to the first side portion. A distance from the second side portion to a position at which the second extension portion is bent may be longer than a distance from the second side portion to a position at which the first extension portion is bent. The second extension portion may be bent to enclose the first side portion of the mold frame.

According to exemplary embodiments of the present invention, an extension portion of a PCB which drives a light source of a backlight assembly extends through an opening formed through an opening-formed portion of a mold frame, thereby preventing a corner of a first substrate of a liquid crystal display ("LCD") panel from being damaged.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
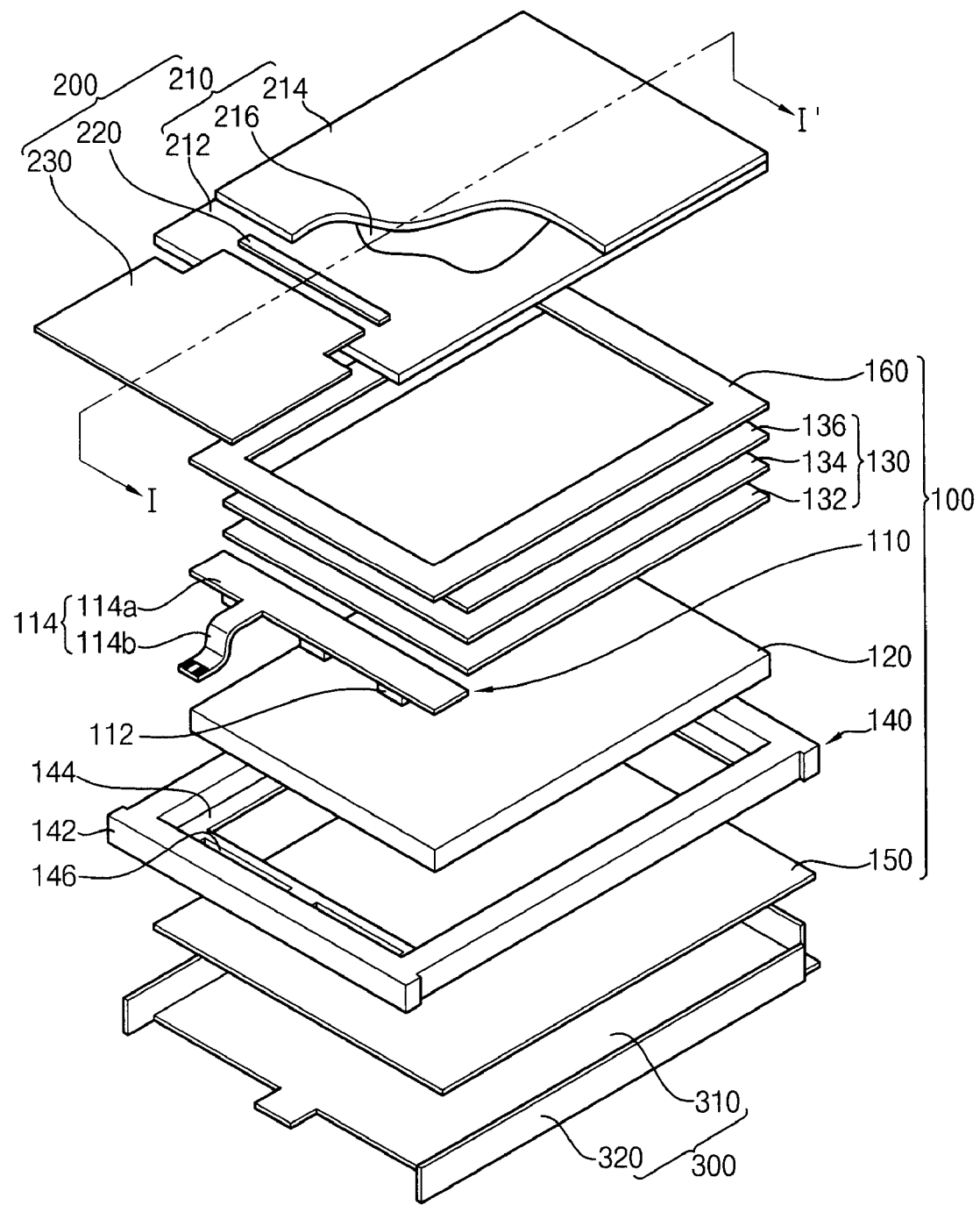
FIG. 1 is an exploded top perspective view illustrating a liquid crystal display ("LCD") device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
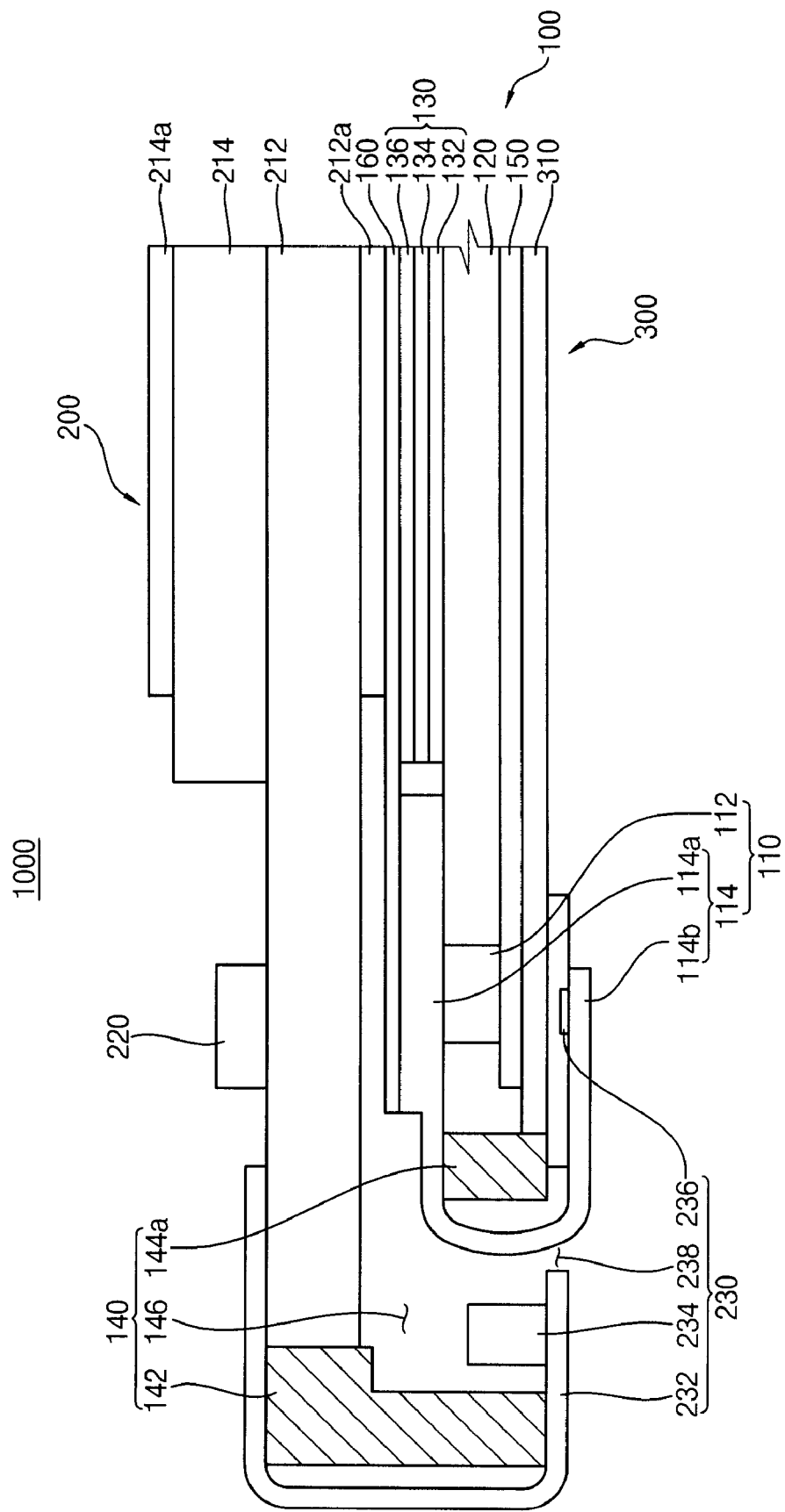
FIG. 2 is a partial cross-sectional view of the LCD device taken along a line I-I' in FIG. 1 according to an exemplary embodiment of the present invention.

FIG. 1 is an exploded top perspective view illustrating a liquid crystal display ("LCD") device according to an exemplary embodiment of the present invention. FIG. 2 is a partial cross-sectional view taken along line I-I' of the LCD device according to an exemplary embodiment of the present invention in FIG. 2.

Referring to FIGS. 1 and 2, an LCD device 1000 includes a backlight assembly 100, an LCD panel assembly 200 and a receiving container 300.

The backlight assembly 100 generates light, and provides the light to the LCD panel assembly 200. The backlight assembly 100 includes a light-generating part 110, a light-guiding member 120, an optical member 130 and a mold frame 140.

The light-generating part 110 includes a light source (not shown) and a first printed circuit board ("PCB") 114. In an exemplary embodiment, the light source includes a plurality of light-emitting diodes ("LEDs") 112, as shown in FIG. 1. The LEDs 112 are disposed on the first PCB 114, and the first PCB 114 applies a voltage for generating the light from the LEDs 112. The first PCB 114 includes a light source installed portion 114a and an extension portion 114b, and may include a flexible portion, for example, but is not limited thereto.

The light-guiding member 120 guides the light from the light-generating part 110 and the guided light exits the light-guiding member 120 on a first side of the light-guiding member 120, e.g., a side closest to the optical member 130, as shown in FIG. 1. Thus, the light-guiding member 120 changes a point-type light of the LEDs 112 to a planar light which exits the light-guiding member 120 as described above.

The light-guiding member 120 may correspond to, for example, but is not limited thereto, a flat-type light-guiding plate which has a uniform thickness from a second side, e.g., a side adjacent to the LEDs 112, to a third side opposite to the second side, as shown in FIG. 1. In alternative exemplary embodiments, the light-guiding member 120 may correspond to a wedge-typed light-guiding plate (not shown) which has a thickness decreasing from the second side adjacent to the LEDs 112 to the third side opposite the second side.

The optical member 130 is disposed on the light-guiding member 120 to enhance optical characteristics of the light provided from the light-guiding member 120. For example, the optical member 130 may include a light-diffusing sheet 132 which enhances luminance uniformity, a prism sheet 134 which improves a viewing angle, and a dual brightness enhancement film ("DBEF") 136 which increases luminance and/or a viewing angle, but is not limited thereto.

The mold frame 140 receives the light-generating part 110, the light-guiding member 120 and the optical member 130. Further, the mold frame 140 includes a side portion 142 and a support portion 144. The side portion 142 defines a frame shape of the mold frame. More specifically, the frame shape is a substantially rectangular shape with a length of a first and an opposite second short side extending beyond a lateral width defined by and substantially perpendicular to a third and an opposite fourth long side, as shown in FIG. 1. The support portion 144 protrudes inward from the side portion 142 in a substantially horizontal direction and supports the light-generating part 110, the light-guiding member 120 and the optical member 130.

An opening 146 is formed between the first short side of the mold frame 140, e.g., a side nearest the first printed circuit board 114, and the support portion 144 of the mold frame 140. In an exemplary embodiment, the support portion 144 includes an opening-formed portion 144a (FIG. 2), and the opening 146 is formed through the opening-formed portion 144a. For example, the opening-formed portion 144a is positioned at a predetermined location of the support portion 144 corresponding to the light-generating part 110, as shown in FIG. 2. Further, in an exemplary embodiment as shown in FIG. 1, two openings 146 are formed through the opening-formed portion 144a. In alternative exemplary embodiments, however, a different number of openings 146, e.g., one or more than two openings 146, may be formed through the opening-formed portion 144a.

The backlight assembly 100 may further include a reflective sheet 150. The reflective sheet 150 is disposed under the light-guiding member 120, e.g., on a side of the light-guiding member 120 opposite the mold frame 140, as illustrated in FIG. 1. A portion of light which is generated from the light-generating part 110 and guided by the light-guiding member 120 may leak toward the reflective sheet 150. The reflective sheet 150 reflects the leaked light back toward the light-guiding member 120.

The backlight assembly 100 may further include a complementary member 160. The complementary member 160 is disposed between the LCD panel assembly 200 and the optical member 130 to complement a gap between the mold frame 140 and the optical member 130, and/or a gap between the mold frame 140 and a sidewall 320 of the receiving container 300. The complementary member 160 may be disposed corresponding to a peripheral region of the LCD panel assembly 200. The complementary member 160 may include a black adhesive tape, for example, but is not limited thereto.

The LCD panel assembly 200 receives the light from the backlight assembly 100 to display an image. The LCD panel assembly 200 includes an LCD panel 210, a driver chip 220 and a second PCB 230.

The LCD panel 210 is disposed over the light-guiding member 120 to display an image using the light provided from the light-guiding member 120. The LCD panel 210 includes a first substrate 212, a second substrate 214 and a liquid crystal layer 216.

The first substrate 212 includes a plurality of pixel electrodes (not shown) arranged in a substantially matrix shape, a plurality of thin film transistors ("TFTs") (not shown) which apply a driving voltage to an associated pixel electrode, a plurality of gate lines (not shown) and a plurality of data lines (not shown), for example, but is not limited thereto. The second substrate 214 includes a color filter layer (not shown) facing the pixel electrodes formed on the first substrate 210 and a common electrode (not shown) formed on the color filter layer, for example, but is not limited thereto. The liquid crystal layer 216 is interposed between the first substrate 212 and the second substrate 214. A first polarizer 212a may be disposed on the first substrate 212, and a second polarizer 214a may be disposed on the second substrate 214.

The second PCB 230 includes a base substrate 232, a circuit element 234, a connection portion 236 and a through-hole 238. Further, the second PCB 230 provides a driving signal which drives the LCD panel 210. The driver chip 220 is disposed on the first substrate 212 to control timing of applying the driving signal provided from the second PCB 230 to the LCD panel 210. A chip-on-glass ("COG") method of directly mounting the driver chip 220 on the LCD panel 210 may be used, for example, but is not limited thereto. Further, the second PCB 230 may include a flexible portion, for example, but is not limited thereto in alternate exemplary embodiments of the present invention.

The receiving container 300 receives the backlight assembly 100 and the LCD panel assembly 200. The receiving container 300 includes a bottom plate 310 and a plurality of sidewalls 320 protruding from the bottom plate 310. The bottom plate 310 and the plurality of sidewalls 320 define a receiving space to receive the backlight assembly 100 and the LCD panel assembly 200.

Figure 3:
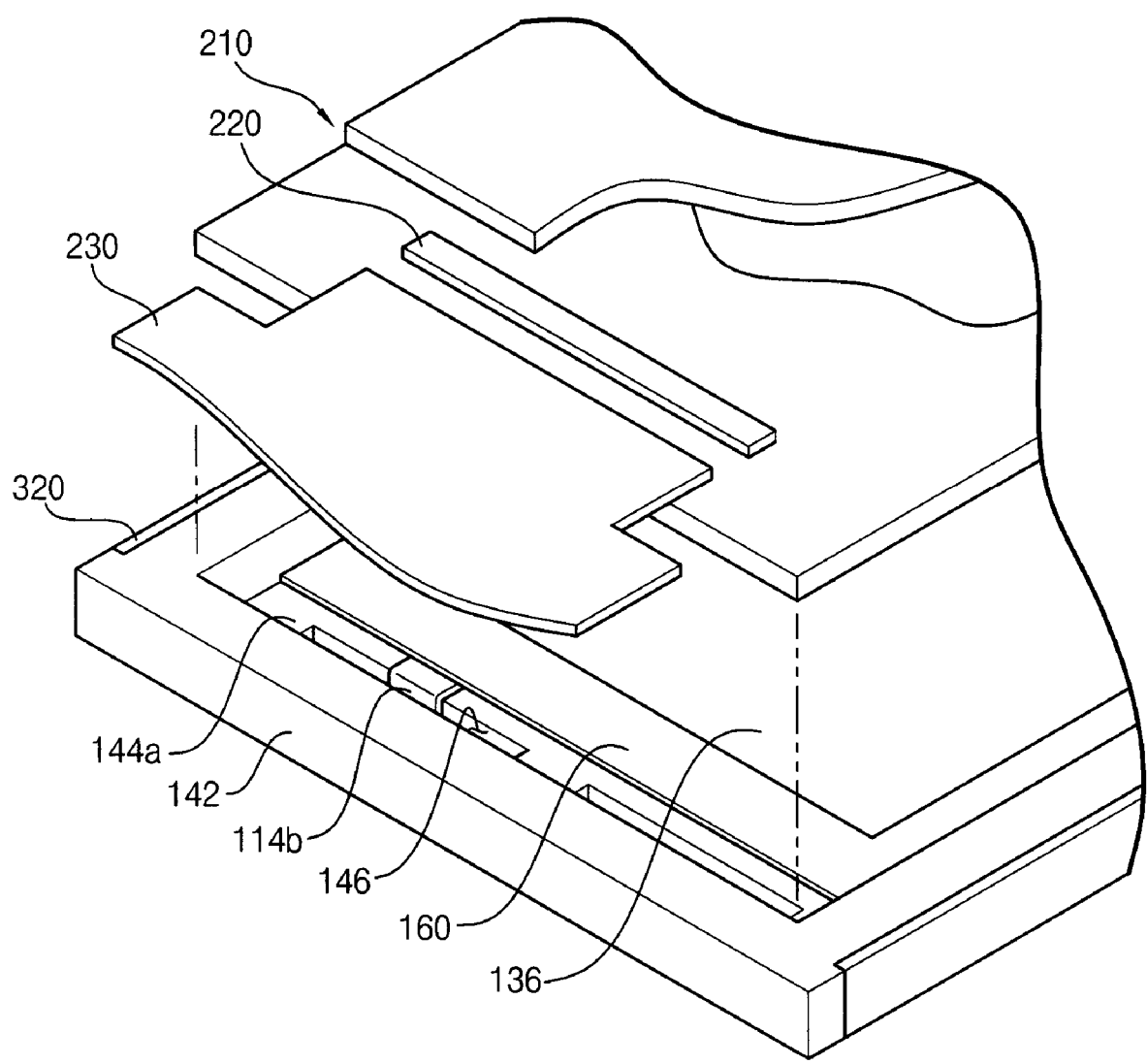
FIG. 3 is an exploded partial top perspective view illustrating a positional relationship of first and second printed circuit boards ("PCBs") of the LCD device according to an exemplary embodiment of the present invention in FIGS. 1 and 2.
Figure 4:
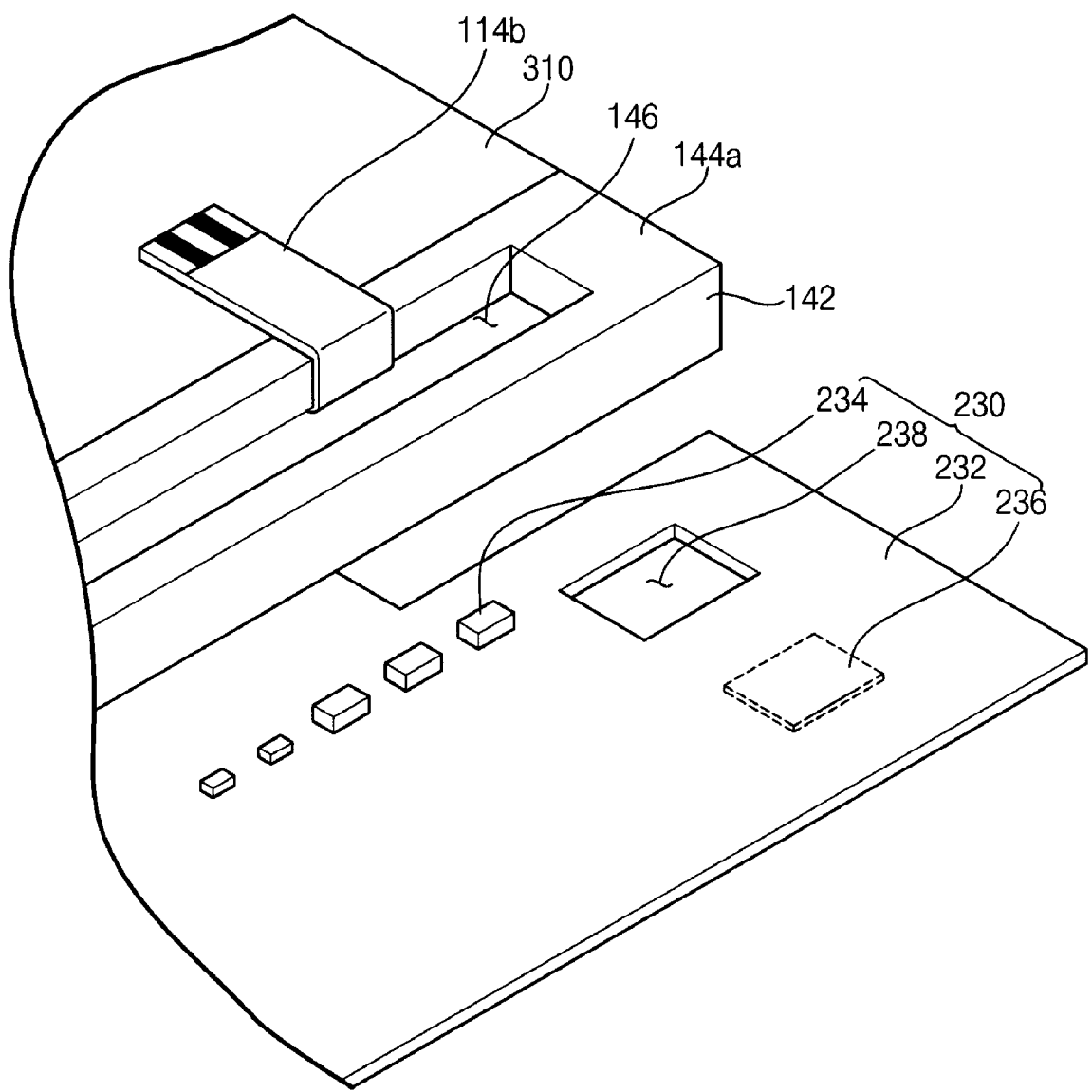
FIGS. 4 and 5 are exploded partial perspective views illustrating the positional relationship of the first and second PCBs of the LCD device according to an exemplary embodiment of the present invention in FIGS. 1 and 2.
Figure 5:
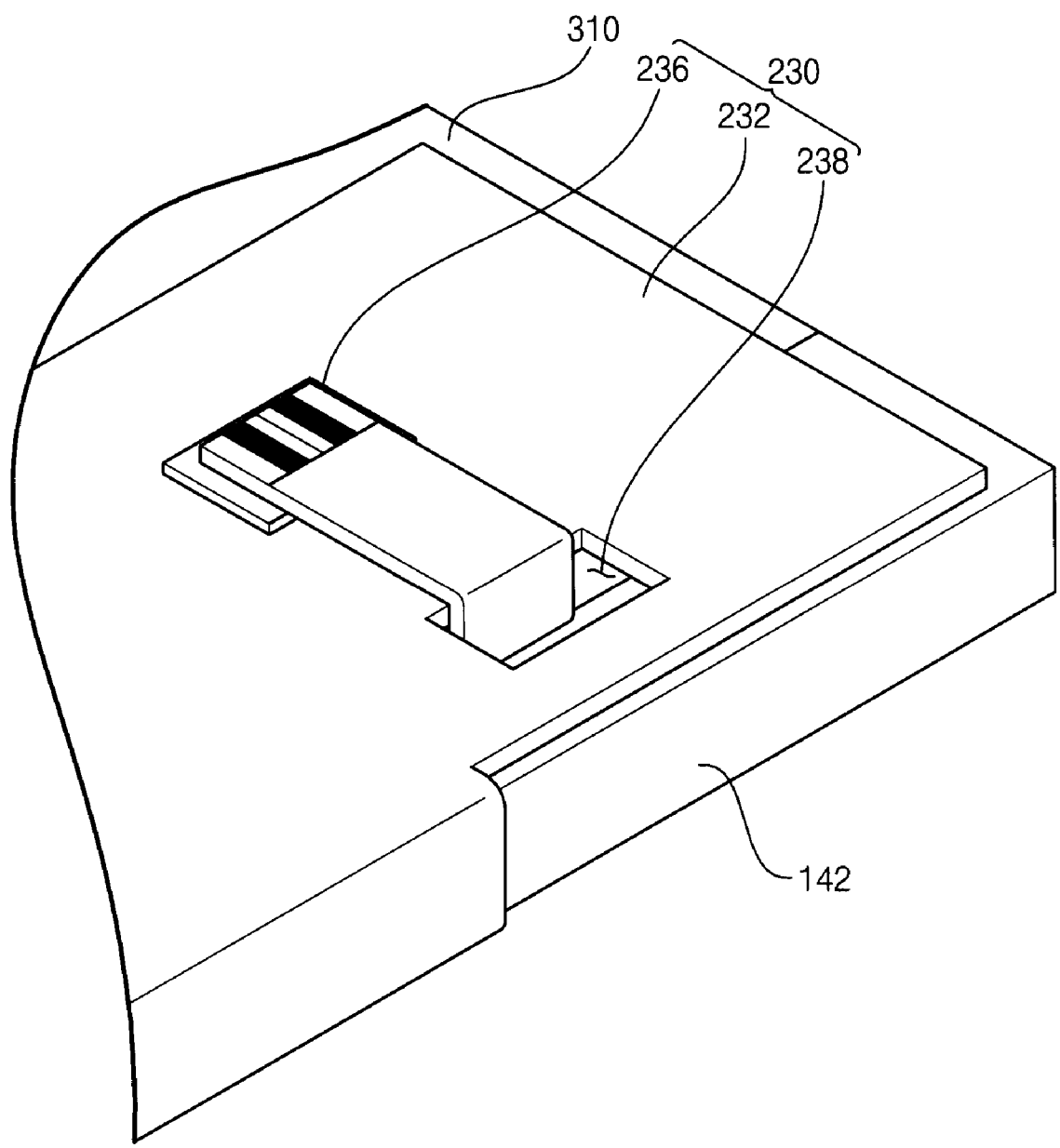

FIG. 3 is an exploded partial top perspective view illustrating a positional relationship of the first and second PCBs of the LCD device according to an exemplary embodiment of the present invention in FIGS. 1 and 2. FIGS. 4 and 5 are exploded partial perspective views illustrating the positional relationship of the first and second PCBs of the LCD device according to an exemplary embodiment of the present invention in FIGS. 1 and 2. More specifically, FIG. 4 is an exploded bottom perspective view illustrating the LCD device including the second PCB before the second PCB is completely disposed, and FIG. 5 is an exploded a top perspective view illustrating the LCD device including the second PCB after the second PCB is completely disposed.

Referring to FIGS. 1 to 5, the first PCB 114 includes the light source installed portion 114a and the extension portion 114b described above.

The light source installed portion 114a is disposed at a side of the optical member 130, and the LEDs 112 are disposed on the light source installed portion 114a.

For example, the light source installed portion 114a may correspond to a flexible PCB ("FPCB") having flexibility. In alternate exemplary embodiments, the light source installed portion 114a may correspond to a rigid PCB ("RPCB") not having flexibility.

The extension portion 114b extends from the light source installed portion 114a, as shown in FIG. 1. The extension portion 114b extends to a rear surface of the LCD device 1000 through the opening 146 formed at the opening-formed portion 144a.

As illustrated in FIGS. 1 to 5, the extension portion 114b is integrally formed with the light source installed portion 114a. In alternative exemplary embodiments, a separate connector (not shown) may be formed at an end of the extension portion 114b adjacent to the light source installed portion 114a, and the extension portion 114b may be electrically coupled to the light source installed portion 114a through the separate connector.

Further, the extension portion 114b may include a flexible portion, and the extension portion 114b may include a flexible circuit film, for example, but is not limited thereto.

If the extension portion 114b encloses the side portion 142 of the mold frame 140 and extends to the rear surface of the LCD device 1000, as in the prior art, instead of extending to the rear surface of the LCD device 1000 through the opening 146 formed at the opening-formed portion 144a, as in exemplary embodiments of the present invention, the extension portion 114b impacts a lower corner of the first substrate 212 of the LCD panel 210 causing stress and/or damage to the LCD panel 210.

In addition, if the extension portion 114b encloses the side portion 142 of the mold frame 140 and extends to the rear surface of the LCD device 1000, as in the prior art, a groove (not shown) is formed at an upper surface of the side portion 142 of the mold frame 140 to guide the extension portion 114b and the extension portion 114b extends to the rear surface of the LCD device 1000 via the groove. Thus, the stress is concentrated at a portion of the first substrate 212 which is adjacent to the groove formed at the mold frame 140, thereby damaging the first substrate 212.

However, as shown in FIGS. 3 to 5, the extension portion 114b according to the exemplary embodiments of the present invention described herein extends through the opening 146 formed at the opening-formed portion 144a. Thus, the extension portion 114b does not impact the lower corner of the first substrate 212 of the LCD panel 210, and the first substrate 212 is thereby not damaged in exemplary embodiments of the present invention.

Another improvement flowing from exemplary embodiments of the present invention is that the groove for guiding the extension portion 114b is not formed at the upper surface of the side portion 142 of the mold frame 140, since the extension portion 114b extends through the opening 146 formed at the opening-formed portion 144a. Thus, the upper surface of the side portion 142 of the mold frame 140, which corresponds to the extension portion 114b, remains substantially flat.

Referring to FIG. 4, the second PCB 230 includes the base substrate 232, the circuit element 234, the connection portion 236 and the throughhole 238 as described above in reference to FIG. 1. The second PCB 230 is electrically connected to an end portion of the LCD panel 210 to drive the LCD panel 210.

Referring to FIG. 4, a plurality of circuit elements 234 is formed on the base substrate 232. The base substrate 232 may include a flexible material and may be bent to be disposed under the mold frame 140 (FIG. 2). For example, referring back to FIG. 2, the base substrate 232 encloses the side portion 142 of the mold frame 140 and is bent to the rear surface of the bottom plate 310 of the receiving container 300, but is not limited thereto.

Further referring to FIG. 2, the mold frame includes a first side portion corresponding to the side portion 142 of the mold frame 140 enclosed by the base substrate 232, and a second side portion opposite to the first side portion. A distance from the second side portion to a position at which the base substrate 232 is bent is longer than a distance from the second side portion to a position at which the extension portion 114b of the first PCB 114 is bent.

Referring again to FIG. 4, the circuit element 234 is formed at a position on the base substrate 232 corresponding to the opening 146 formed at the opening-formed portion 144a of the mold frame 140. Thus, when the base substrate 232 is bent to face the bottom plate 310 of the receiving container 300 (FIG. 2), the circuit element 234 of the second PCB 230 is disposed within the opening 146 formed through the mold frame 140, thereby preventing an expansion in size of the LCD device 1000, since the circuit element 234 is disposed in the opening 146 (FIG. 2).

Still referring to FIG. 4, the connection portion 236 is formed corresponding to a terminal (not shown) positioned at an end of the extension portion 114b of the first PCB 114, and is positioned on the rear surface of the base substrate 232. Thus, the first PCB 114 is electrically connected to the second PCB 230 through the connection portion 236, and receives a driving signal from the second PCB 230.

The throughhole 238 is formed through the base substrate 232 so that the extension portion 114b of the first PCB 114 passes through the throughhole 238, and thus the extension portion 114b of the first PCB may be disposed on the rear surface of the base substrate 232. The throughhole 238 corresponds to the opening 146 formed through the mold frame 140. The extension portion 114b is disposed on the rear surface of the base substrate 232 through the throughhole 238, and is electrically connected to the connection portion 236 formed on the rear surface of the base substrate 232. The throughhole 238 is larger than or substantially the same size as the extension portion 114b of the first PCB 114, as shown in FIGS. 2, 4 and 5.

Figure 6:
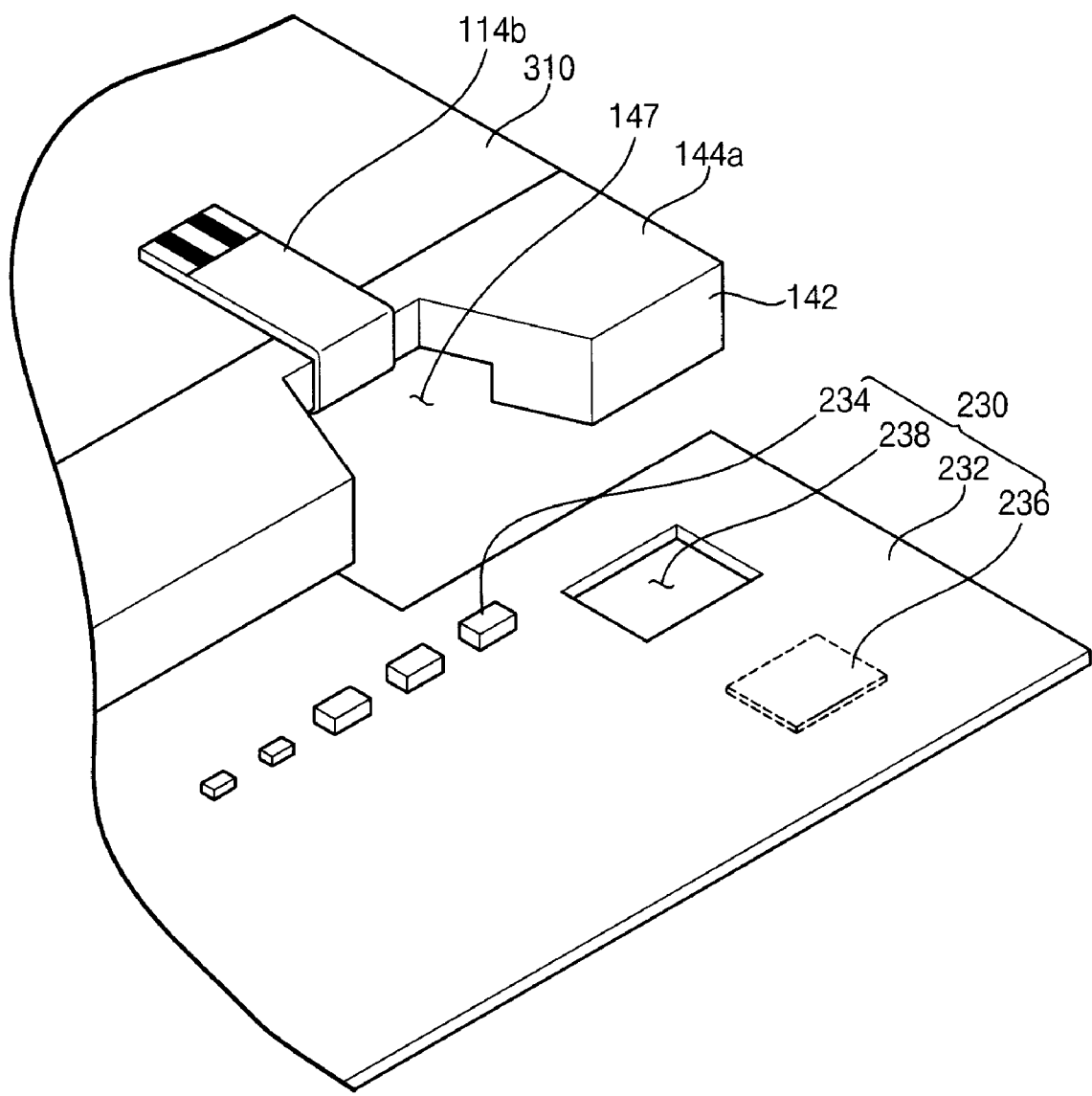
FIG. 6 is an exploded partial bottom perspective view illustrating an alternative exemplary embodiment of an opening of the LCD device according to an exemplary embodiment of the present invention in FIGS. 1 to 5.

FIG. 6 is an exploded partial bottom perspective view illustrating an alternative exemplary embodiment of an opening of the LCD device according to an exemplary embodiment of the present invention in FIGS. 1 to 5. The LCD device illustrated in FIG. 6 is substantially the same as the LCD device illustrated in FIGS. 1 to 5 except for a shape of the opening of the mold frame. Thus, any repetitive description will be omitted.

Referring to FIG. 6, an opening 147 is formed at a side of the mold frame 140. In an exemplary embodiment of the present invention, the opening 147 is formed through the opening-formed portion 144a, as discussed above in reference to FIGS. 1 to 5.

The opening 147 is open to the side portion 142 of the mold frame 140 corresponding to the extension portion 114b of the first PCB 114, as shown in FIG. 6.

Although not shown in FIG. 6, when the base substrate 232 is bent to face the bottom plate 310 of the receiving container 300, as discussed above in reference to FIG. 2, the circuit element 234 formed on the second PCB 230 may be disposed at a groove formed adjacent to the opening 147. In alternate exemplary embodiments, the opening 147 may be formed to have a size sufficient for the circuit element 234 to be disposed within the opening 147.

Figure 7:
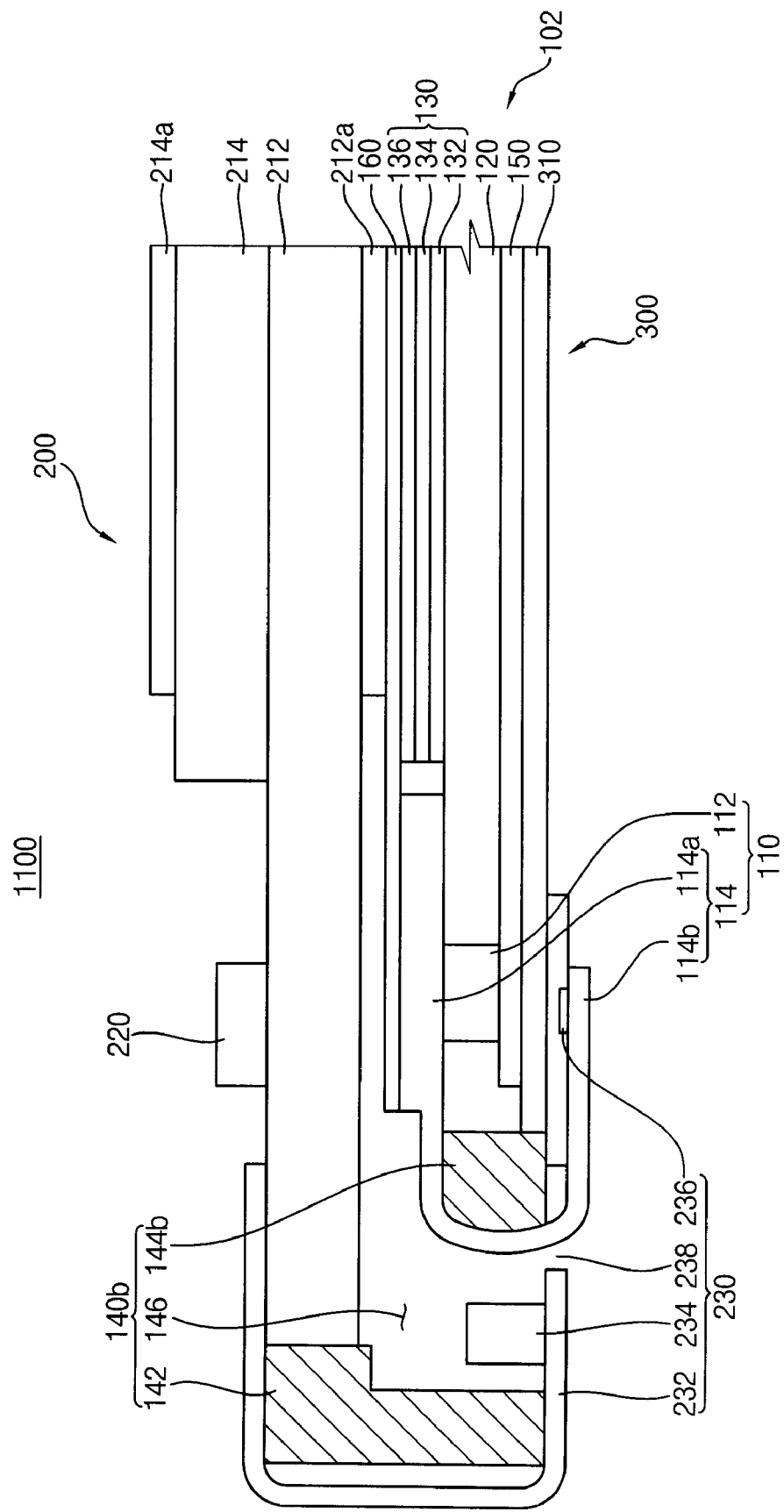
FIG. 7 is a partial cross-sectional view illustrating an LCD device according to another exemplary embodiment of the present invention.

FIG. 7 is a partial cross-sectional view illustrating an LCD device according to another exemplary embodiment of the present invention. The LCD device illustrated in FIG. 7 is substantially the same as the LCD device illustrated in FIGS. 1 to 5 except for the opening-formed portion of the mold frame. Thus, any repetitive description will be omitted.

Referring to FIG. 7, an LCD device 1100 includes a backlight assembly 102, an LCD panel assembly 200 and a receiving container 300.

The backlight assembly 102 includes a light-generating part 110, a light-guiding member 120, an optical member 130 and a mold frame 140b.

The mold frame 140b includes a side portion 142 and a support portion 144 (FIG. 1), and an opening 146 is formed through a side of the mold frame 140b.

The support portion 144 includes an opening-formed portion 144b, and the opening 146 is formed through the opening-formed portion 144b. For example, the opening-formed portion 144b may be positioned at a predetermined location of the support portion 144 corresponding to the light-generating part 110.

As shown in FIG. 7, a surface of the support portion 144 (FIG. 1) which defines the opening 146 formed at the opening-formed portion 144b makes contact with the extension portion 114b of the first PCB 114 and includes a substantially round portion which conforms to the curvature of the bent extension portion 114b described in further detail above. More specifically, the opening-formed portion 144b may be rounded toward the side portion 142 of the mold frame 140b, corresponding to the extension portion 114b of the light-generating part 110 extending from the light source installed portion 114a of the light-generating part 110, for example, but is not limited thereto.

Thus, since the extension portion 114b extends along and conforms to the rounded surface of the opening-formed portion 144b, the extension portion 114b may be more stably disposed in comparison with the exemplary embodiment described with reference to FIG. 2, in which the opening-formed portion 144a is not rounded, thereby preventing the extension portion 114b from being damaged.

Figure 8:
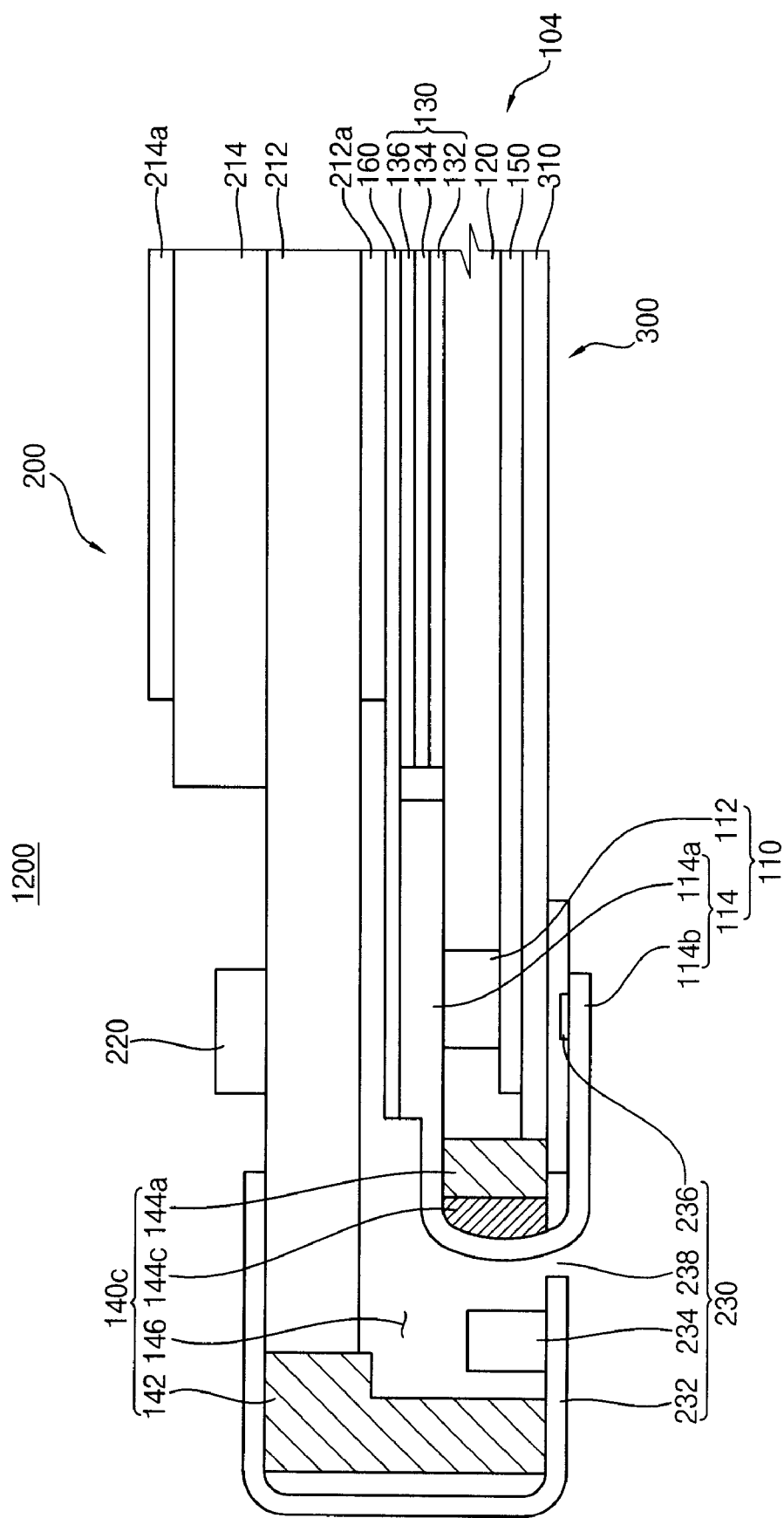
FIG. 8 is a partial cross-sectional view illustrating an LCD device according to still another exemplary embodiment of the present invention.

FIG. 8 is a partial cross-sectional view illustrating an LCD device according to still another exemplary embodiment of the present invention. The LCD device illustrated in FIG. 8 is substantially the same as the LCD device illustrated in FIGS. 1 to 5 except for a bumper disposed at the opening-formed portion of the mold frame. Thus, any repetitive description will be omitted.

Referring to FIG. 8, an LCD device 1200 includes a backlight assembly 104, an LCD panel assembly 200 and a receiving container 300.

The backlight assembly 104 includes a light-generating part 110, a light-guiding member 120, an optical member 130 and a mold frame 140c.

The mold frame 140c includes a side portion 142 and a support portion 144, and an opening 146 is formed through a side of the mold frame 140c.

The support portion 144 (FIG. 1) includes an opening-formed portion 144a, and the opening 146 is formed through the opening-formed portion 144a. The opening-formed portion 144a may be positioned at a predetermined location of the support portion 144 corresponding to the light-generating part 110, for example, but is not limited thereto.

Referring to FIG. 8, the mold frame 140c includes a bumper 144c. The bumper 144c is disposed on a surface of the support portion 144, which defines the opening 146 formed at the opening-formed portion 144a and makes contact with the extension portion 114b of the first PCB 114.

The bumper 144c may include a material having elasticity. Thus, the bumper 144c may be shaped in a substantially round shape which flexes to conform to the curvature of the bent extension portion 114b described in further detail above. More specifically, the bumper 144c may be rounded toward the side portion 142 of the mold frame 140c corresponding to the extension portion 114b of the light-generating part 110 extending from the light source installed portion 114a of the light-generating part 110.

As a result, since the extension portion 114b extends along the bumper 144c, the extension portion 114b is more stably disposed in comparison with the exemplary embodiment described with reference to FIG. 2, in which the opening-formed portion 144a is not rounded, thereby preventing the extension portion 114b from being damaged. In addition, the bumper 144c made from a material having elasticity may therefore change shape in response to a change of tension of the extension portion 114b, to thereby continually conform to the shape of the extension portion 144b, preventing the extension portion 114b from being damaged.

Figure 9:
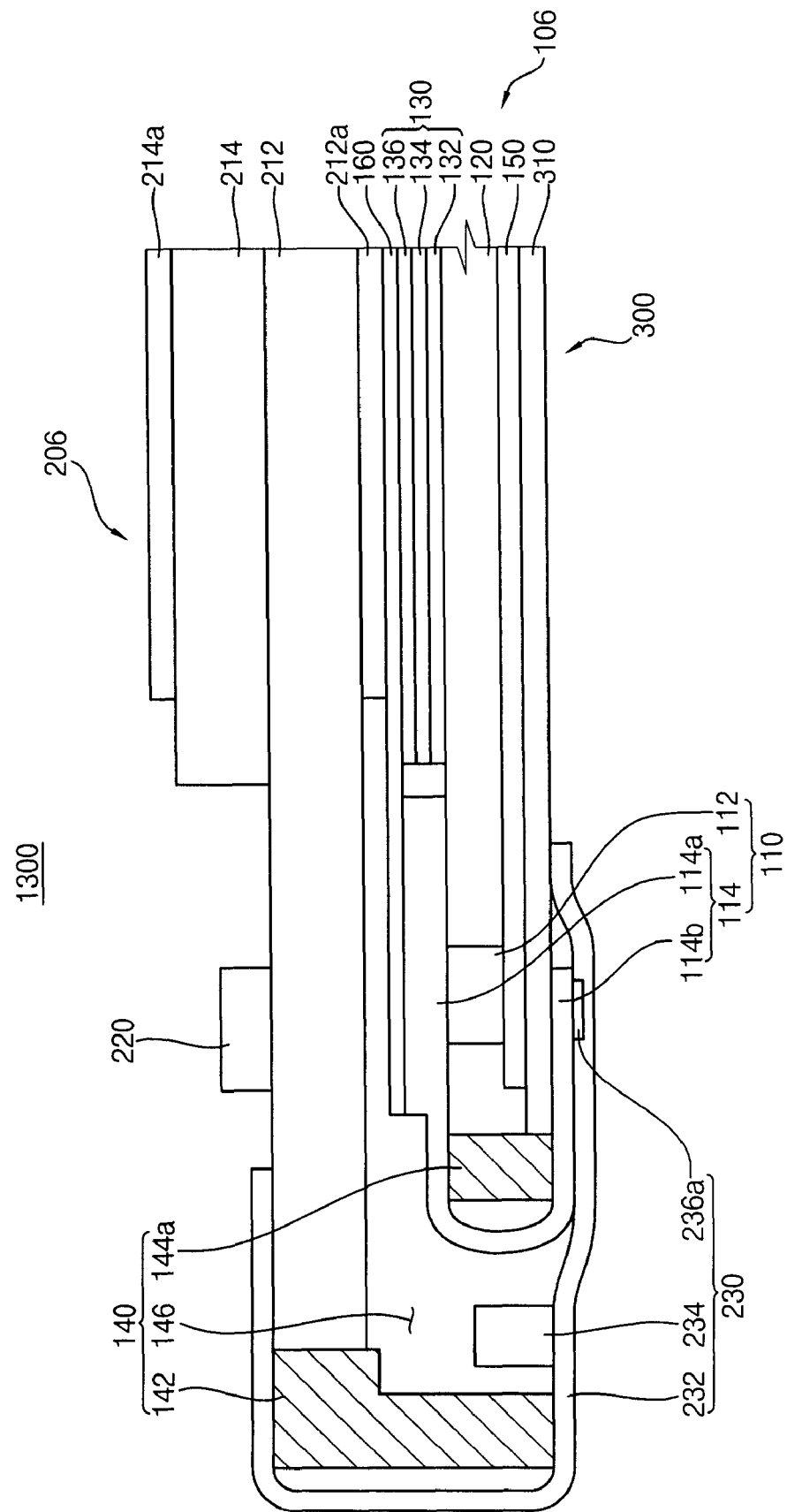
FIG. 9 is a partial cross-sectional view illustrating an LCD device according to still another exemplary embodiment of the present invention.

FIG. 9 is a partial cross-sectional view illustrating an LCD device according to still another exemplary embodiment of the present invention. The LCD device illustrated in FIG. 9 is substantially the same as the LCD device illustrated in FIGS. 1 to 5 except for a positional relationship between the first PCB and the second PCB, and a throughhole of the second PCB. Thus, any repetitive description will be omitted.

Referring to FIG. 9, an LCD device 1300 includes a backlight assembly 106, an LCD panel assembly 206 and a receiving container 300.

The backlight assembly 106 includes a light-generating part 110, a light-guiding member 120, an optical member 130 and a mold frame 140. The light-generating part 110 includes an LED 112 serving as a light source and a first PCB 114.

The LCD panel assembly 206 includes an LCD panel 210, a driver chip 220 and a second PCB 230.

The first PCB 114 includes a light source installed portion 114a and an extension portion 114b.

The second PCB 230 includes a base substrate 232, a circuit element 234 and a connection portion 236a. The second PCB 230 is electrically connected to an end portion of the LCD panel 210 to drive the LCD panel 210.

The base substrate 232 is bent to be disposed below the mold frame 140. More specifically, the base substrate 232 encloses the side portion 142 of the mold frame 140, and is bent to a rear surface of a bottom plate 310 of the receiving container 300, e.g., there is no throughhole in the second PCB 230 of the exemplary embodiment of the present invention shown in FIG. 9.

Put another way, the extension portion 114b of the first PCB 114 is disposed on a front surface of the base substrate 232 of the second PCB 230, which is different from the LCD device 1000 illustrated in FIGS. 1 to 5. Thus, the second PCB 230 does not include a throughhole through which the extension portion 114b of the first PCB 114 passes.

Since the first PCB 114 is disposed on the front surface of the second PCB 230, the connection portion 236a is formed on the front surface of the second PCB 230 corresponding to a terminal (not shown) formed at an end of the extension portion 114b of the first PCB 114. The first PCB 114 is electrically connected to the second PCB 230 through the connection portion 236a, and receives a driving signal from the second PCB 230.

In an exemplary embodiment, the LCD device 1300 illustrated in FIG. 9 includes the mold frame 140 illustrated in FIGS. 1 to 5. In alternate exemplary embodiments, the LCD device 1300 may include the mold frame 140b having the opening-formed portion 144b which is rounded, as illustrated in FIG. 7, or the mold frame 140c having the bumper 144c, as illustrated in FIG. 8, for example, but is not limited thereto.

According to exemplary embodiments of the present invention described herein, a PCB driving a light source of a backlight assembly includes an extension portion, and the extension portion extends via an opening formed through an opening-formed portion of a mold frame to be electrically connected to a PCB driving an LCD panel.

Accordingly, in comparison with a case of the prior art in which a groove is formed at a side portion of the mold frame and the extension portion extends via the groove, damage to a corner of a first substrate of the LCD panel according to exemplary embodiments of the present invention is effectively prevented or reduced.

In addition, in alternate exemplary embodiments, a surface of a support portion of the mold frame which defines the opening and makes contact with the extension portion includes a round portion, or, in yet another alternate exemplary embodiment, a bumper is formed on the surface, thereby further effectively reducing or preventing damage to the extension portion.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a light source which generates light;
   a light-guiding member which guides the light generated from the light source;
   a display panel disposed over the light-guiding member to display an image using the light provided from the light-guiding member;
   a mold frame which receives the light-guiding member and the display panel, an opening being formed through the mold frame; and
   a first printed circuit board which drives the light source, the first printed circuit board comprising an extension portion extending through the opening of the mold frame,
   wherein the mold frame comprises:
   a support portion supporting the light-guiding member; and
   a side portion extending upwardly from an edge of the support portion to guide sides of the display panel,
   wherein the opening is formed through the support portion such that the opening is a closed shape and is separated from the side portion of the mold frame, and is disposed adjacent to the light source, the side portion enclosing an area defined as inside of the side portion, and the extension portion of the first printed circuit board is bent at a location inside of the side portion.

2. The display device of claim 1, wherein the first printed circuit board further comprises a light source installed portion on which the light source is disposed, and the extension portion extends from the light source installed portion through the opening of the mold frame.

3. The display device of claim 2, wherein the light source installed portion comprises one of a flexible printed circuit board and a rigid printed circuit board.

4. The display device of claim 1, further comprising a second printed circuit board electrically connected to an end portion of the display panel to drive the display panel.

5. The display device of claim 4, wherein the second printed circuit board is bent to be disposed below the mold frame.

6. The display device of claim 5, wherein a circuit element of the second printed circuit board is positioned within the opening formed through the mold frame.

7. The display device of claim 4, wherein the extension portion of the first printed circuit board is electrically connected to the second printed circuit board.

8. The display device of claim 4, wherein a throughhole is formed through the second printed circuit board, the extension portion of the first printed circuit board passes through the throughhole and the first printed circuit board is disposed on a rear surface of the second printed circuit board.

9. The display device of claim 8, wherein the throughhole of the second printed circuit board corresponds to the opening formed through the mold frame.

10. The display device of claim 8, wherein a size of the throughhole is greater than or equal to a size of the extension portion of the first printed circuit board.

11. The display device of claim 8, wherein the second printed circuit board comprises a connection portion formed on the rear surface of the second printed circuit board corresponding to a terminal formed at an end portion of the extension portion of the first printed circuit board, the connection portion being electrically connected to the terminal.

12. The display device of claim 4, wherein the first printed circuit board is disposed on a front surface of the second printed circuit board, and the second printed circuit board comprises a connection portion formed on the front surface of the second printed circuit board corresponding to a terminal formed at an end portion of the extension portion of the first printed circuit board, the connection portion being electrically connected to the terminal.

13. The display device of claim 1, wherein a side portion of the mold frame corresponding to the extension portion comprises a flat upper surface.

14. The display device of claim 1, wherein a surface which defines the opening and makes contact with the extension portion of the first printed circuit board comprises a round portion.

15. The display device of claim 1, wherein the mold frame comprises a bumper formed on a surface which defines the opening and makes contact with the extension portion of the first printed circuit board.

16. The display device of claim 1, wherein the extension portion comprises a flexible portion.

17. A display device comprising:
a light source which generates light;
a light-guiding member which guides the light generated from the light source;
a display panel disposed over the light-guiding member to display an image using the light provided from the light-guiding member;
a mold frame which receives the light-guiding member and the display panel, an opening being formed through the mold frame; and
a first printed circuit board which drives the light source, the first printed circuit board comprising an extension portion extending through the opening of the mold frame,
wherein the mold frame comprises:
a support portion supporting the light-guiding member; and
a side portion extending upwardly from an edge of the support portion to guide sides of the display panel,
wherein the opening is formed through the support portion, and is disposed adjacent to the light source,
wherein the extension portion of the first printed circuit board is bent to pass through a portion of the opening, the opening being a closed shape, the portion of the opening being separated from the side portion of the mold frame and the edge of the support portion in a plan view, the side portion enclosing an area defined as inside of the side portion, and the extension portion of the first printed circuit board is bent at a location inside of the side portion.

18. The display device of claim 17, wherein the first printed circuit board further comprises a light source installed portion on which the light source is disposed, and the extension portion extends from the light source installed portion through the opening of the mold frame.

19. The display device of claim 18, wherein the light source installed portion comprises one of a flexible printed circuit board and a rigid printed circuit board.

20. A method of manufacturing a display device, the method comprising:
disposing a display panel over a light-guiding member to display an image using a light provided from the light-guiding member which guides the light generated from a light source which generates the light;
forming an opening through a mold frame which receives the light-guiding member and the display panel; and
driving the light source by a first printed circuit board, the first printed circuit board comprising an extension portion extending through the opening of the mold frame,
wherein the mold frame comprises:
a support portion supporting the light-guiding member; and
a side portion extending upwardly from an edge of the support portion to guide sides of the display panel, the side portion enclosing an area defined as inside of the side portion, wherein the opening is formed through the support portion such that the opening is a closed shape and is separated from the side portion of the mold frame, and is disposed adjacent to the light source, and the extension portion of the first printed circuit board is bent at a location inside of the side portion.

* * * * *